US010187204B2

(12) United States Patent
Lawrenson et al.

(10) Patent No.: US 10,187,204 B2
(45) Date of Patent: Jan. 22, 2019

(54) GENERATING A KEY FOR USE AS A SHARED SECRET

(71) Applicant: Telefonaktiebolaget L M Ericsson (publ), Stockholm (SE)

(72) Inventors: Matthew John Lawrenson, Bussigny (CH); Lars Andersson, Solna (SE); Till Burkert, Huddinge (SE); Harm Stefan Cronie, Echallens (CH); Julian Charles Nolan, Pully (CH); Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 473 days.

(21) Appl. No.: 14/900,627

(22) PCT Filed: Nov. 17, 2015

(86) PCT No.: PCT/EP2015/076820
§ 371 (c)(1),
(2) Date: Dec. 22, 2015

(87) PCT Pub. No.: WO2016/142014
PCT Pub. Date: Sep. 15, 2016

(65) Prior Publication Data
US 2018/0159683 A1 Jun. 7, 2018

(51) Int. Cl.
*H04L 9/08* (2006.01)
*H04L 9/32* (2006.01)
(Continued)

(52) U.S. Cl.
CPC ............ *H04L 9/085* (2013.01); *H04L 9/0861* (2013.01); *H04L 9/0866* (2013.01); *H04L 9/14* (2013.01);
(Continued)

(58) Field of Classification Search
CPC ....................................................... G06F 7/588
See application file for complete search history.

(56) References Cited

U.S. PATENT DOCUMENTS 8,981,800 B2 * 3/2015 Tzivanopoulos ...... G01R 15/20
324/713
9,086,460 B2 * 7/2015 Rice ................... G01R 31/3606
(Continued)

FOREIGN PATENT DOCUMENTS

JP     H0384657 U    8/1991
JP    2011526113 A    9/2011
(Continued)

OTHER PUBLICATIONS

Harry, Katherine J. et al., "Detection of subsurface structures underneath dendrites formed on cycled lithiummetal electrodes", Nature Materials, vol. 13, Jan. 2014, 69-73.
(Continued)

*Primary Examiner* — Josnel Jeudy
(74) *Attorney, Agent, or Firm* — Murphy, Bilak & Homillier, PLLC

(57) ABSTRACT

A communications device for generating a key for use as a shared secret in communications with another communications device is provided. Each of the communications devices comprises a sensor array for measuring a spatially-varying magnetic field originating from a first spatially-varying density of metallic particles comprised in a first battery, when subjected to an excitation magnetic field, and processing means operative to acquire a set of values from the sensor array, which set of values represents the spatially-varying magnetic field, and to derive the key from the set of values. The excitation magnetic field is generated by a magnetic-field generator comprised in one of the communications devices. Thereby, the two communications devices (Continued)

may, when in proximity, generate identical keys by probing the spatially-varying density of metallic particles comprised in the first battery.

30 Claims, 4 Drawing Sheets

(51) Int. Cl.
  *H04L 9/14* (2006.01)
  *H04L 9/30* (2006.01)
  *H01M 10/0525* (2010.01)
  *H01M 10/48* (2006.01)

(52) U.S. Cl.
  CPC .............. *H04L 9/30* (2013.01); *H04L 9/3278* (2013.01); *H01M 10/0525* (2013.01); *H01M 10/482* (2013.01)

(56) References Cited

U.S. PATENT DOCUMENTS

| | | | | |
|---|---|---|---|---|
| 9,395,418 | B2 * | 7/2016 | Rahaman | G01R 31/3679 |
| 9,511,670 | B2 * | 12/2016 | Conell | B60L 11/1805 |
| 9,535,130 | B2 * | 1/2017 | Labbe | G01R 31/3606 |
| 2008/0163504 | A1 * | 7/2008 | Smith | G01C 17/30 |
| | | | | 33/268 |
| 2009/0109049 | A1 * | 4/2009 | Frederick | F16P 3/14 |
| | | | | 340/686.6 |
| 2011/0199079 | A1 * | 8/2011 | Tamura | H01M 10/44 |
| | | | | 324/252 |
| 2014/0085271 | A1 * | 3/2014 | Hwang | G06F 3/046 |
| | | | | 345/179 |
| 2014/0108478 | A1 * | 4/2014 | Lee | G06F 7/588 |
| | | | | 708/250 |
| 2015/0071431 | A1 | 3/2015 | Zhu et al. | |

FOREIGN PATENT DOCUMENTS

| | | |
|---|---|---|
| KR | 20050069991 A | 7/2005 |
| KR | 20120101976 A | 9/2012 |
| WO | 2008075638 A1 | 6/2008 |

OTHER PUBLICATIONS

Yin, C.-E. et al., "Kendall Syndrome Coding (KSC) for Group-Based Ring-Oscillator Physical Unclonable Functions", ISR Technical report, University of Maryland, 2011-13, 1-11.
Yin, C.-E. et al., "LISA: Maximizing RO PUF's secret extraction", 2010 IEEE International Symposium on Hardware-Oriented Security and Trust (HOST)., 2010, 100-105.
Yamamoto, Ryota et al., "Operation and Authentication of Smart Phone by Earphone", Information Processing Society of Japan, Interaction 2013, Japan, Mar. 2, 2013, 626-631.

* cited by examiner

GENERATING A KEY FOR USE AS A SHARED SECRET

TECHNICAL FIELD

The invention relates to a communications device for generating a key for use as a shared secret in communications with another communications device, a corresponding method, a corresponding computer program, and a corresponding computer program product.

BACKGROUND

Many applications of communications devices require secure communications to exchange data with one or more other communications devices or a communications network. In the present context, a communications device is an electronic device capable of effecting communications using a wired or wireless technology in combination with one or more suitable communication protocols.

A first example is to exchange a document, a message, an email, or an image, between a first mobile terminal, such as a mobile phone, a smartphone, a User Equipment (UE), a tablet, or a laptop, and a second mobile terminal. A second example is Machine-to-Machine (M2M) communications between a mobile terminal and a sensor or actuator. A third example is the communication between a mobile terminal and a payment terminal for effecting a financial transaction at a point-of-sale.

Encryption may be used to provide a certain level of security for data and messages transmitted between two or more communications devices, or a communications device and a communications network. Several encryption schemes, in particular symmetric schemes, are based on the availability of a shared secret, i.e., information such as a bit string or a string of symbols which is shared between, and only available to, the communications devices which are engaged in a communications sessions. Such a shared secret may be generated in software or hardware at one communications device, or at a separate network entity, and distributed to the other communications devices. The process of sharing the secret is not straightforward and is vulnerable to attacks. For instance, the shared secret may be revealed as a result of eavesdropping, man-in-the-middle attacks, or the like.

SUMMARY

It is an object of the invention to provide an improved alternative to the above techniques and prior art.

More specifically, it is an object of the invention to provide an improved solution for generating a key for use as a shared secret in communications between two or more communications devices, or between a communications device and a communications network.

These and other objects of the invention are achieved by means of different aspects of the invention, as defined by the independent claims. Embodiments of the invention are characterized by the dependent claims.

According to a first aspect of the invention, a communications device for generating a key is provided. The communications device may, e.g., be a handheld device such as a mobile terminal, a UE, a smartphone, a tablet, a laptop, a wearable device such as a smartwatch, a sensor, an actuator, or a device like a cash register or a payment terminal for effecting financial transactions at a point-of-sale. The key may be used as a shared secret in communications with another communications device. The communications device comprises a communications interface for effecting communications with the other communications device, a sensor array for measuring a spatially-varying magnetic field originating from a first spatially-varying density of metallic particles comprised in a first battery, when subjected to an excitation magnetic field, and processing means. The sensor array may, e.g., comprise sensors based on any one, or a combination, of inductors, magneto-resistive sensors, Hall-effect sensors, spin transistors, fluxgates, magneto-electrical sensors, and magneto-optical sensors. The processing means is operative to acquire a set of values from the sensor array and derive the key from the set of values. The set of values represents the spatially-varying magnetic field.

According to a second aspect of the invention, a method of a communications device of generating a key is provided. The key may be used as a shared secret in communications with another communications device. The method comprises measuring a spatially-varying magnetic field originating from a first spatially-varying density of metallic particles comprised in a first battery, when subjected to an excitation magnetic field, acquiring a set of values from the sensor array, and deriving the key from the set of values. The spatially-varying magnetic field is measured using a sensor array. The set of values represents the spatially-varying magnetic field.

According to a third aspect of the invention, a computer program is provided. The computer program comprises computer-executable instructions for causing a device to perform the method according to an embodiment of the second aspect of the invention, when the computer-executable instructions are executed on a processing unit comprised in the device.

According to a fourth aspect of the invention, a computer program product is provided. The computer program product comprises a computer-readable storage medium which has the computer program according to the third aspect of the invention embodied therein.

The invention makes use of an understanding that a key for use as a shared secret in communications between at least two communications devices may be established by utilizing a physical process which is characterized by a natural randomness. Thereby, true random numbers may be generated. Embodiments of the invention are advantageous in that each one of two or more communications devices may generate a copy of the key, thereby establishing a shared secret without necessitating the complex and vulnerable process of sharing a key generated by one communications device with other communications devices.

The invention is based on the concept of a Physical Unclonable Function (PUF), which may be described as a function with a set of input values leading to a set of output values which are defined by a physical process. The input space may be rather large, and it is considered impossible to fully characterize the function transforming the input values into the output values. A PUF may be realized by probing a physical system and measuring a set of physical quantities as a response.

Embodiments of the invention utilize metallic particles which arise as a consequence of chemical processes in at least one battery, the first battery, as PUF. The battery or batteries may, e.g., be of type lithium-ion or lithium-polymer, and the metallic particles may be lithium dendrites which are known to grow over the course of several battery charge/discharge cycles on the surface of the lithium electrode and spread across the battery's electrolyte until they reach the other electrode [K. J. Harry, D. T. Hallinan, D. Y.

Parkinson, A. A. MacDowell, and N. P. Balsara, "Detection of subsurface structures underneath dendrites formed on cycled lithium metal electrodes", in Nature Materials, vol. 13, pages 69-73, 2014]. Since the local density, composition, or concentration, of metallic particles, i.e., their spatial distribution in the battery, is the result of a stochastic process, keys which are derived by probing different batteries are different from each other with very high likelihood. Thereby, a shared secret may be established which is unique for the battery, or the combination of batteries, used for generating the key.

To this end, each of the communications devices measures the spatially varying density of metallic particles in the same battery by utilizing an array of magnetic-field sensors which allows measuring the spatially-varying magnetic field originating from the metallic particles, with a spatial resolution determined by the number of sensors in the array. The values which are used for deriving the key represent spatial variations of the measured magnetic field.

The spatially-varying magnetic field originating from the first battery arises in response to an excitation magnetic field which the first battery, and thereby the metallic particles contained therein, is subjected to. The excitation magnetic field penetrates the battery such that eddy currents are excited in the metallic particles. This excitation field may, e.g., be generated by one of the communications devices, subsequent to which each of the communications devices measures the spatially-varying magnetic field independently of the other communications device. As an alternative, each of the communications devices may generate the excitation magnetic field for exciting eddy currents in the metallic particles and subsequently measures the resulting spatially-varying magnetic field, one device at a time.

Since the spatial distribution of metallic particles in a battery changes over time, an identical copy of the key can only be re-generated during a certain time interval after a first communications device has generated the key. Thereby, the possibility to generate identical copies of the key at a later stage is limited. The time interval is determined by the rate of growth of the metallic particles, which is determined by the rate of charge/discharge cycles the battery is subjected to, and the algorithm used for deriving the key from the values representing the measured spatially-varying magnetic field. Advantageously, this is an assurance that a shared secret generated by two communications devices can only be re-generated during a limited time interval. This makes it more difficult for a malicious device to generate an identical copy of the key at a later point in time.

Moreover, since the at least two communications devices which establish a shared secret in accordance with embodiments of the invention need to be in proximity of the same battery during a limited time interval, from which battery each one of the communications devices derives a copy of the same key, an assurance can be made that the at least two communications devices have been in proximity when the shared secret was established. Thereby, the risk of a malicious device generating a copy of the shared secret is mitigated.

The set of values acquired from the sensor array are converted into a key or security token, e.g., a binary bit string or a string of symbols other than bits, and may be used in algorithms for security applications, in particular encryption, decryption, signing, hashing, and the like. The actual conversion from the measured physical quantity, which can often be represented by a set of real or complex numbers, to a bit string or string of symbols may be performed by a bit/symbol extraction algorithm. In the field of PUFs there are several well-known algorithms which are described further below.

It will be appreciated that the algorithm which is used for converting the measured values into the key is preferably substantially insensitive to small variations in the values used as input to the algorithm, and should allow generating the same key, with rather high likelihood, in both communications devices when in proximity of the first battery. For instance, the key may be derived from the set of values by means of base conversion. Optionally, in order to increase resilience against measurement noise and the like, only the most significant bits may be used. Alternatively, if each value of the set of values represents the spatially-varying magnetic field as measured by a respective sensor of the sensor array, the key may be derived from the set of values based on one or more indices of sensors which have measured one or more selected values of the set values. As an example, one more statistical values, such as a minimum, a maximum, an average, or a median, of the set of values may be identified, and the respective indices of the sensors which have measured these values may be utilized in deriving the key. As a further example, all values may be ordered, in ascending order, descending order, or any other order, and the corresponding sensor indices may be used for deriving the key. Preferably, the indices are assigned to the sensors in accordance with an order of the sensors within the sensor array.

According to an embodiment of the invention, the first battery is comprised in the communications device. That is, the communications device derives the key from its internal battery. Correspondingly, another communications device with which the communications device seeks to establish a shared secret may derive a copy of the key by measuring the spatially-varying magnetic field originating from the first battery, using its own sensor array.

According to an embodiment of the invention, the measured magnetic field originates from the first spatially-varying density of metallic particles comprised in the first battery and a second spatially-varying density of metallic particles comprised in a second battery when subjected to the excitation magnetic field. The second battery is comprised in the other communications device. Similar to the first battery, the second battery may be of type lithium-ion or lithium-polymer, the metallic particles may be lithium dendrites, and the second spatially-varying density of metallic particles may vary over time. This embodiment of the invention is advantageous in that the shared secret is unique for the combination of two batteries, or the two communications devices comprising these batteries. Thereby, the risk of generating a copy of the key by a malicious device is further mitigated.

According to an embodiment of the invention, the communications device further comprises a magnetic-field generator for generating the excitation magnetic field. The magnetic-field generator may, e.g., be a coil and a power supply arranged for driving a current through the coil. Advantageously, an inductor coil provided for the purpose of wireless charging may be utilized. To this end, the communications device generates the excitation magnetic field for exciting eddy currents in the metallic particles comprised in the first and, optionally, the second battery. Optionally, the excitation magnetic field may be generated in response to detecting that the other communications device is in proximity of the communications device. Alternatively, the excitation magnetic field may be generated in response to receiving an instruction from a user of the communications device. For instance, the user may press a button, start an app, shake the device, or perform a gesture, to initiate establishing a shared secret. As yet a further alternative, the excitation magnetic field may be generated in response to receiving a request from the other communications device. For instance, the other communications device may request establishing a secure communication session. This is particularly advantageous if the other communications device does not comprise a magnetic-field generator, or if each of the communications devices conducts an autonomous process for establishing a shared secret.

According to another embodiment of the invention, the excitation magnetic field may be generated by the other communications device. Optionally, the set of values may be acquired from the sensor array in response to detecting the excitation magnetic field generated by the other communications device. The sensor array may, e.g., measure the spatially-varying magnetic field either in response to receiving a request for the set of values or in response to detecting the excitation magnetic field. Alternatively, the spatially-varying magnetic field may be measured continuously or periodically.

In the case of two communications devices which are brought into proximity for the purpose of establishing a shared secret in accordance with embodiments of the invention, at least one of the communications devices comprises a magnetic-field generator for exciting eddy currents in the first battery and, optionally, the second battery, subsequent to which the spatially-varying magnetic field may be measured by both of the communications devices. As an alternative, each of the communications devices may, in a process separate from the other communications device, generate the excitation magnetic field and subsequently measure the spatially-varying magnetic field.

Even though advantages of the invention have in some cases been described with reference to embodiments of the first aspect of the invention, corresponding reasoning applies to embodiments of other aspects of the invention. Moreover, embodiments of the invention may be utilized for establishing a key for use as a secret shared by more than two communications devices which are in proximity of the same battery during measuring the spatially-varying magnetic field.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Cryptography is frequently used to secure communications between devices. One class of cryptography methods are asymmetric encryption methods, which are based on an underlying mathematical problem which is considered to be hard to solve with the levels of computational power currently available, such as factorization of large integers or discrete logarithm. Practical schemes based on public and private keys are in widespread use today, but suffer from the disadvantage that the required computational power may not be available, e.g., in constrained devices with limited battery capacity or processing power, such as M2M devices.

Another class of encryption methods is based on symmetric encryption. An example is the one-time pad method, in which a preferably random bit string is used as a secret shared between two devices which wish to exchange a message securely. The first device may perform an exclusive OR of the message and the random bit string to form an encoded message. The encoded message is the transmitted to the second device where it is decoded by performing an exclusive OR of the received message with the random bit string. The one-time pad method offers a stronger notion of security than asymmetric methods, such as public-private key cryptography. Furthermore, the computational requirements are comparatively low, so the method is suitable for implementation in constrained devices. A major disadvantage of the method is the need to distribute the random bit string to be used as shared secret among all devices engaged in a communications session, without revealing it to malicious devices.

In the following, embodiments of the communications device for generating a key for use as a shared secret in communications with another communications device are described.

Figure 1:
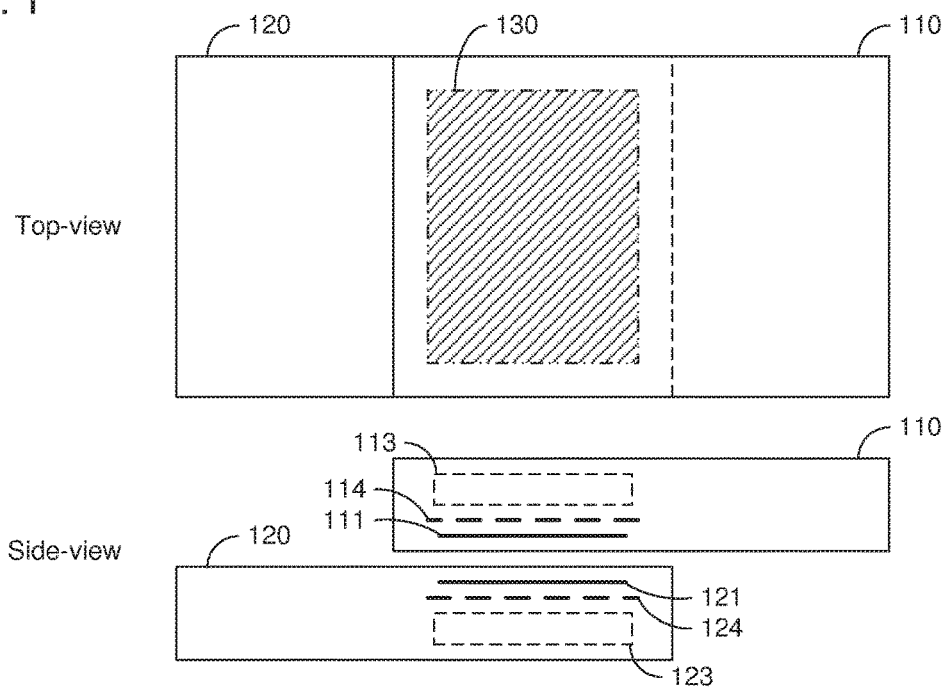
FIG. 1 shows top- and side-view of two communications devices in proximity, in accordance with an embodiment of the invention.

In FIG. 1, two communications devices 110 and 120 which are brought into proximity are illustrated in top-view (top part) and side-view (bottom part), in accordance with embodiments of the invention. Each one of communications devices 110 and 120 is an embodiment of communications device 200 illustrated in FIG. 2, which is described in further detail below, and may, e.g., be a mobile terminal, a UE, a smartphone, a wearable device, a tablet, a smartwatch, a cash register or a payment terminal at a point-of-sale, an M2M device such as a sensor or an actuator, or a laptop. One of communications devices 110 and 120 may, e.g., be comprised in a vehicle, such as a car, truck, bus, boat, train, airplane, or drone, or in a household appliance, e.g., white goods, door locks, surveillance and alarm equipment, or autonomous vacuum cleaners and grass cutters.

Embodiments of the invention utilize the spatially-varying density of metallic particles in a first battery, and optionally a second battery, for generating a key which may be used as a shared secret in secure communications between two communications devices, such as communications devices 110 and 120. The first battery and the second battery may, e.g., be lithium-polymer or lithium-ion batteries which are known to develop lithium dendrites over time. In particular, the first battery and optionally the second battery are preferably comprised in communications devices 110 and 120, respectively. In other words, the first battery and the second battery correspond to batteries 113 and 123 illustrated in FIG. 1, or vice versa.

The first spatially-varying density of metallic particles comprised in the first battery, and optionally the second spatially-varying density of metallic particles comprised in the second battery, can be probed by exciting eddy currents in the metallic particles using an excitation magnetic field, e.g., a magnetic-field pulse or an alternating-current (ac) magnetic field, which is preferably generated by a magnetic-field generator 114/124 comprised in at least one of communications devices 110 and 120. The eddy currents give rise to a magnetic field which is spatially varying, owing to the spatially-varying density of metallic particles in the first and the second battery, respectively. By measuring the spatially-varying magnetic field, a set of values can be derived which represent the spatially-varying density of magnetic particles in the first battery, or a combination of the first spatially-varying density of magnetic particles and the second spatially-varying density of magnetic particles. If the metallic particles are the result of a stochastic process, as is the case for lithium dendrites, their respective spatially-varying density, or spatial distribution, in each battery is unique. Accordingly, the measured values are a response from a PUF, from which a random key or a secret token can be derived for use as a shared secret.

The underlying concept of metal detection technology based on magnetic fields dates back to the 1930's, but has advanced with the advent of digital signal processing. Metal detectors typically comprise two coils or inductors, where the first inductor is fed with a current such that a magnetic field, the excitation magnetic field, is generated. The generated magnetic field induces eddy currents in any metallic particle which is subjected to the excitation magnetic field. The eddy currents in turn generate a magnetic field which may be picked up by the second inductor and measured. The resulting signal has a characteristic structure which may be used to detect and differentiate different metal particles.

One may distinguish two basic operating modes for metal detectors. The first operating mode is the pulse induction detection mode. In this mode the excitation magnetic field strength has a pulse shape (possibly periodic) of finite duration. The measured magnetic field strength follows the excitation magnetic field strength closely until the end of the pulse. At that point the measured magnetic field strength shows a characteristic decay. The shape of the decay and decay time depend on the amount and type of metal particles present. The second operating mode is a continuous wave detection mode where a periodically varying excitation magnetic field is used. In this mode, the difference in amplitude and phase between the excitation magnetic field and the measured magnetic field reflects the amount and type of metallic particles present.

As is illustrated in FIG. 1, communications devices 110 and 120 are brought into proximity of each other for the purpose of generating a key for use as a shared secret in communications between them, in accordance with embodiments of the invention. In order to be able to measure the spatially-varying magnetic field which originates from metallic particles in one or both of batteries 113 and 123, communications devices 110 and 120 need to be arranged relative to each other so that the sensor array 111/121 comprised in one of the communications devices is able to measure the spatially-varying magnetic field originating from battery 123/113 comprised in the other communications device with sufficient accuracy. Moreover, if first communications device 110 additionally comprises a magnetic-field generator 114 for generating the excitation magnetic field, the relative arrangement of communications devices 110 and 120 should be such that the generated excitation field penetrates battery 123 comprised in the second communications device so as to excite eddy currents which give rise to a magnetic field of measurable strength. In FIG. 1, this is illustrated by means of a region 130, which may be indicated on a face of communications devices 110 and 120, or displayed on a display or touchscreen of devices 110 and 120 (not illustrated in FIG. 2), for guiding users in aligning communications devices 110 and 120 so as to facilitate generating a key in accordance with embodiments of the invention. In practice, region 130 indicates where sensor array 111/121, and optionally battery 113/123 and/or magnetic-field generator 114/124 are arranged in communications device 110 or 120, respectively. It will be appreciated that sensor array 111/121, and optionally battery 113/123 and/or magnetic-field generator 114/124, are preferably provided at, or in proximity of, an outer surface of communications device 110/120. If an embodiment of communications device 110/120 is comprised in a vehicle, such as a car, sensor array 111/121 and optionally magnetic-field generator 114/124 may, e.g., be provided on the dashboard. Alternatively, if an embodiment of communications device 110/120 is comprised in a household appliance, such as white goods, sensor array 111/121, and optionally battery 113/123 and/or magnetic-field generator 114/124, may, e.g., be provided on a control panel of the white goods.

Figure 3:
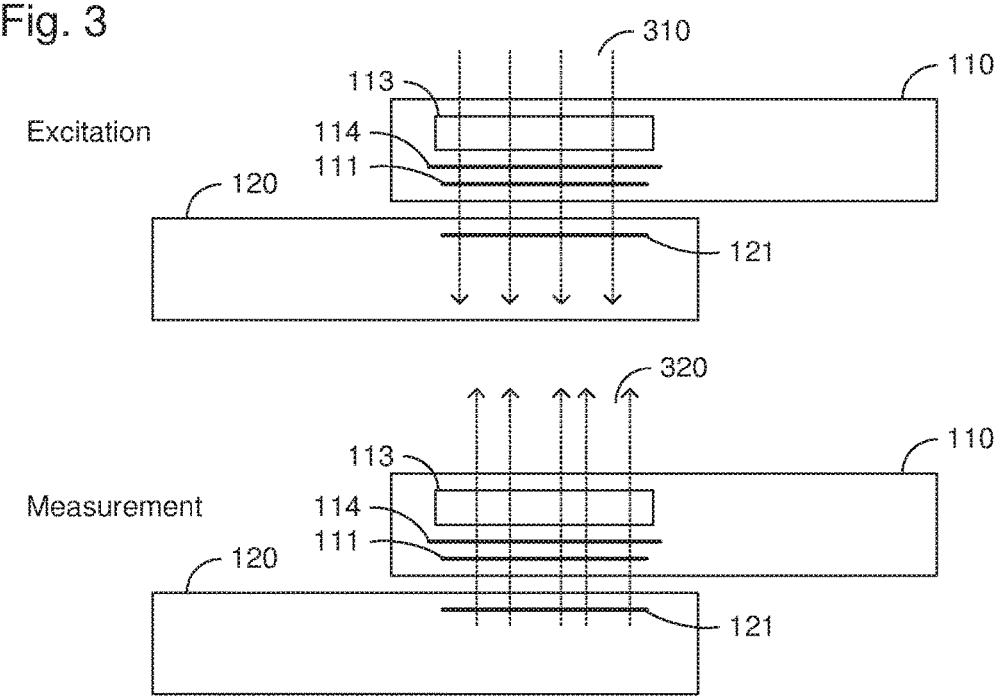
FIG. 3 illustrates generating a key by two communications devices in proximity, in accordance with an embodiment of the invention.
Figure 4:
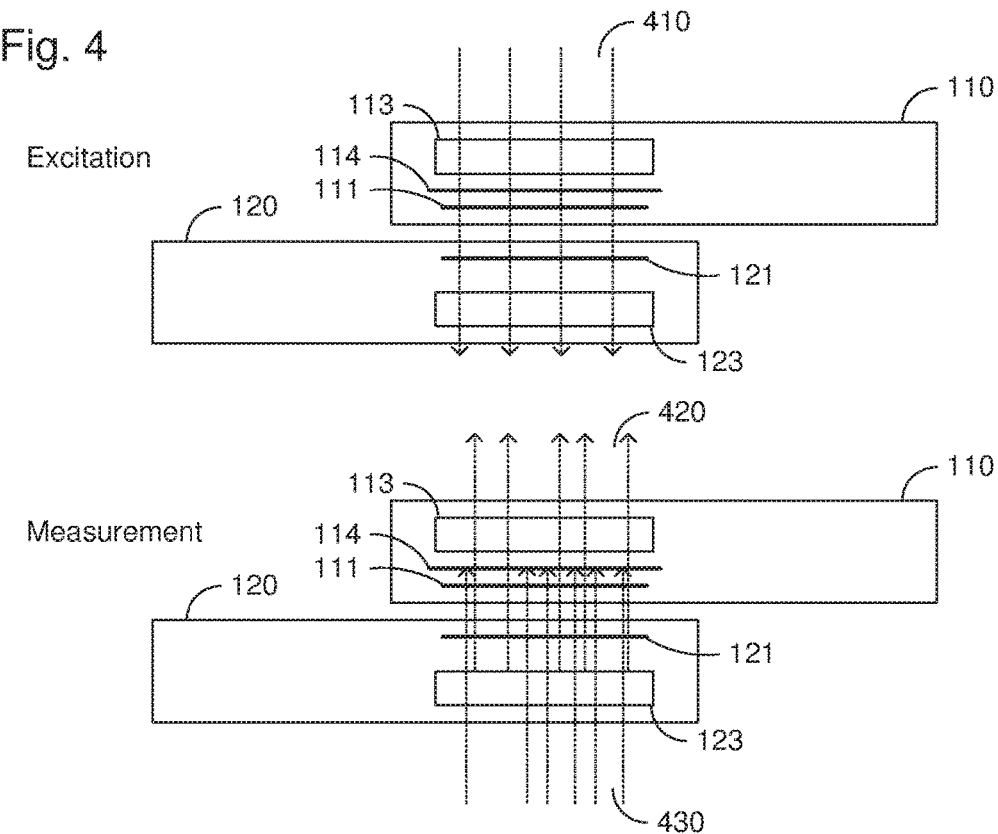
FIG. 4 illustrates generating a key by two communications devices in proximity, in accordance with another embodiment of the invention.

In order to further elucidate the invention, communications devices 110 and 120 brought into proximity are again shown in FIGS. 3 and 4, in which the process of generating a key based on probing the spatial distribution of metallic particles in the first battery, and optionally the second battery, is illustrated (side-view only).

In FIG. 3, first communications device 110 is illustrated as comprising sensor array 111, first battery 113, and magnetic-field generator 114, and second communications device 120 is illustrated as comprising sensor array 121. First communications device 110 may, e.g., be a smartphone, and second communications device 120 a payment terminal at a point-of-sale. Typically, a payment terminal may not comprise a battery but is powered by an electrical power supply. This is also the case if communications device 120 is embodied in a vehicle or a household appliance. Accordingly, smartphone 110 and payment terminal 120 may each generate the key by probing the first spatially-varying density of metallic particles comprised in first battery 113. To this end, during an excitation phase, illustrated in the upper part of FIG. 3, magnetic-field generator 114 generates an excitation magnetic field 310 which penetrates first battery 113. Excitation magnetic field 310 may, e.g., be a magnetic-field pulse or an ac magnetic field. In response to excitation magnetic field 310, eddy currents are excited in the metallic particles comprised in first battery 113, which in turn give rise to a spatially-varying magnetic field 320, illustrated in the lower part of FIG. 3, which is representative of the spatially-varying density of metallic particles in first battery 113. Spatially-varying magnetic field 320 may be measured by sensor array 111 comprised in first communications device 110 and, substantially simultaneously, by sensor array 121 comprised in second communications device 120. Alternatively, one of sensor arrays 111 and 121 may measure spatially-varying magnetic field 320 subsequent to a first excitation magnetic field 310, and the other sensor array may measure spatially-varying magnetic field 320 subsequent to a second excitation magnetic field 310.

FIG. 4 is similar to FIG. 3, with the exception that also second communications device 120 is illustrated as comprising a battery, second battery 123. The configuration illustrated in FIG. 4 applies, e.g., if communications devices 110 and 120 both are smartphones. Accordingly, first 110 and second smartphone 120 may each generate the key by probing the first spatially-varying density of metallic particles comprised in first battery 113 in combination with the second spatially-varying density of metallic particles comprised in second battery 123. This is the case since sensor arrays 111 and 121 cannot separate the contributions from batteries 113 and 123 but can only measure the total magnetic field. To this end, during an excitation phase, illustrated in the upper part of FIG. 4, magnetic-field generator 114 generates an excitation magnetic field 410 which penetrates first battery 113 and second battery 123. Excitation magnetic field 410 may, e.g., be a magnetic-field pulse or an ac magnetic field. In response to excitation magnetic field 410, eddy currents are excited in metallic particles comprised in first battery 113 and second battery 123, which in turn give rise to spatially-varying magnetic fields 420 and 430, respectively, illustrated in the lower part of FIG. 4. Spatially-varying magnetic fields 420 and 430 are representative of the first spatially-varying density of metallic particles in first battery 113 and the second spatially-varying density of metallic particles in second battery 123, respectively. The combination of spatially-varying magnetic fields 420 and 430 may be measured by sensor array 111 comprised in first communications device 110 and, substantially simultaneously, by sensor array 121 comprised in second communications device 120. Alternatively, one of sensor arrays 111 and 121 may measure spatially-varying magnetic fields 420 and 430 subsequent to a first excitation magnetic field 410, and the other sensor array may measure spatially-varying magnetic fields 420 and 430 subsequent to a second excitation magnetic field 410.

Subsequent to measuring the spatially-varying magnetic field originating from first battery 113, and optionally second battery 123, each one of communications devices 110 and 120 derives the key from the set of values acquired from its sensor array 111/121. It will be appreciated that the magnetic fields measured by sensor arrays 111 and 121 are not identical, owing to the different relative arrangement of the source of the excitation magnetic field, such as magnetic-field generator 114 with respect to first battery 113 and second battery 123, as well as the different relative arrangement of sensor arrays 111 and 121 with respect to first battery 113 and second battery 123. However, due to the flat form factor of the type of batteries which are typically provided with modern communications devices, in particular smartphones, tablets, and laptops, and the ability to design the magnetic-field generator such that excitation magnetic field 310/410 is substantially homogenous in the near-field range, the difference in strength of the excitation magnetic field experienced by metallic particles in first battery 113 as compared to metallic particles in second battery 123 is negligible. Likewise, by proper arrangement of sensor arrays 111/121 relative to internal battery 113/123 as compared to an external battery 123/113, the difference between measurements performed by sensor array 111 and sensor array 121 are sufficiently small.

Further with reference to FIGS. 3 and 4, a magnetic-field generator 124 comprised in second communications device 120 may be used instead of, or in addition to, magnetic-field generator 114 comprised in first communications device 110. For instance, rather than utilizing an excitation magnetic field generated by first communications device 110, embodiments of the inventions may utilize an excitation magnetic field generated by second communications device 120. In particular, if sensor arrays 111 and 121 do not measure spatially-varying magnetic field(s) 320, or 420 and 430, simultaneously, each one of communications devices 110 and 120 may generate the key in a separate process. More specifically, first communications device 110 may generate excitation magnetic field 310 or 410 using magnetic-field generator 114 and measure the resulting spatially-varying magnetic field(s) 320, or 420 and 430, based on which it derives the key. Subsequently, second communications device 120 may generate an excitation magnetic field using its magnetic-field generator 124 (not shown in FIGS. 3 and 4) and measure the resulting spatially-varying magnetic field, based on which it derives the key.

Figure 2:
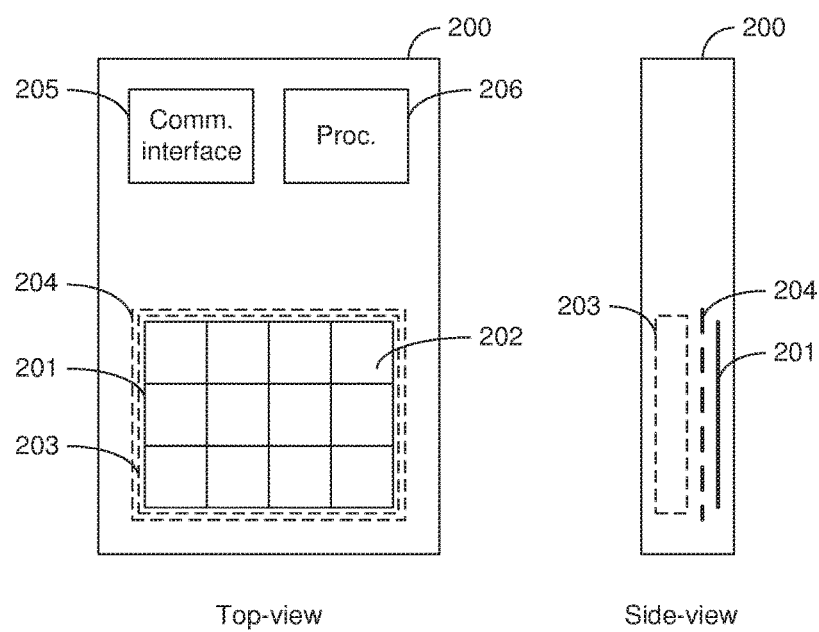
FIG. 2 shows top- and side-view of a communications device, in accordance with an embodiment of the invention.

With reference to FIG. 2, embodiments 200 of the communications device for generating a key for use as a shared secret in communications with another communications device, such as communications devices 110 and 120, are now described in more detail.

Communications device 200 comprises a communications interface 205 for effecting communications with another communications device, a sensor array 201 for measuring a spatially-varying magnetic field originating from a first battery, and processing means 206.

Communications interface 205 may, e.g., be a network interface, such as an Ethernet card, a serial or parallel port such as Universal Serial Bus (USB), FireWire, Lightning, or a radio interface supporting communications over a cellular mobile network, such as Global System for Mobile Communications (GSM), Universal Mobile Telecommunications System (UMTS), or Long Term Evolution (LTE), a Wireless Local Area Network (WLA)/WiFi, Bluetooth, a Near-Field Communication (NFC) technology, ZigBee, or the like.

Sensor array 201 comprises a plurality of sensors 202 which are based on any one, or a combination, of inductors, magneto-resistive sensors, Hall-effect sensors, spin transistors, fluxgates, magneto-electrical sensors, and magneto-optical sensors. Due to the spatial arrangement of sensors 202 in sensor array 201 the spatially-varying magnetic field can be measured with a spatial resolution which is determined by the number of sensors 202 in array 201 and/or the area of each sensor 202. More specifically, each sensor 202 may detect the spatially-varying magnetic field corresponding to the magnetic field lines it encloses. Since the magnitude of the variations in the magnetic field depends on the density of lithium dendrites, the output of each of sensors 202 represents the local lithium-dendrite density. Sensor array 201 is arranged such that it can measure contributions to the spatially-varying magnetic field originating from either one, or both, of a battery 203 comprised in the communications device and a battery comprised in another communications device which is in proximity of the communications device (i.e., either one, or both, of battery 113 and battery 123 illustrated in FIG. 1).

The first battery comprises a first spatially-varying density of metallic particles which give rise to the spatially-varying magnetic field when subjected to an excitation magnetic field penetrating the first battery. The first battery may either be comprised in communications device 200, such as battery 203, or in another communications device. Optionally, the measured magnetic field may originate from the first spatially-varying density of metallic particles and a second spatially-varying density of metallic particles comprised in a second battery which is comprised in the other communications device. The second battery may be of the same, or a different, type as the first battery.

Communications device 200 may further comprise a magnetic-field generator 204 for generating the excitation magnetic field which is used for exciting eddy currents in the first spatially-varying density of metallic particles and optionally in the second spatially-varying density of metallic particles. The excitation magnetic field may, e.g., be a magnetic-field pulse or an ac magnetic field. Magnetic-field generator 204 may, e.g., comprise an inductor coil and a power supply which is arranged for driving a current through the coil. Magnetic-field generator 204 is arranged such that the generated excitation magnetic field penetrates at least one of battery 203 comprised in communications device 200 and a battery comprised in the other communications device which is in proximity of communications device 200. Advantageously, an induction coil provided for the purpose of wireless charging may be utilized for generating the excitation magnetic field.

If a magnetic-field pulse or a sequence of pulses is used as excitation magnetic field, the duration of each pulse is typically in the order of tens of microseconds, while the repetition frequency in a sequence of pulses may be in the order of a few hundred Hz. The general behavior of the spatially-varying magnetic field originating from the eddy currents excited in the metallic particles follows closely the excitation magnetic field. However, after the excitation magnetic-field has vanished, the decay of the measured spatially-varying magnetic field depends on the density of the metallic particles and their type. The decay time of the decaying measured magnetic field may, e.g., be defined as the time it takes for the measured magnetic field strength to decay from 90% to 10% of its maximum value. The decay time of the pulse is proportional to the local densities of metallic particles, such as lithium dendrites in the first battery and optionally the second battery.

An alternative is the use of continuous wave detection. In such case magnetic-field generator 204 generates an excitation magnetic field of sinusoidal strength. As a result, the measured spatially-varying magnetic field also contains one or multiple sinusoidal components. However, since the phase and the amplitude of each of the sinusoidal components depends on the metallic-particle densities, the amplitudes and phases of the magnetic field measured by sensors 202, i.e., complex values, may be utilized for deriving the key.

Optionally, the excitation magnetic field may be generated in response to detecting proximity of the other communications device. For instance, with reference to FIGS. 3 and 4, magnetic-field generator 114 comprised in first communications device 110 may generate excitation magnetic field 310 or 410 in response to detecting proximity of second communications device 120. This may, e.g., be achieved by determining that the signal strength of a radio signal or beacon transmitted by second communications device 120, and received by first communications device 110, exceeds a threshold value. As an alternative, generating the excitation magnetic field may be initiated periodically, or when a timer has expired. It will be appreciated that the entire process of generating the key or establishing secure communications, not just generating the excitation magnetic field, may be initiated in response to detecting proximity of another communications device, periodically, or when a timer has expired.

Magnetic-field generator 204 may optionally generate the excitation magnetic field in response to receiving an instruction from a user of communications device 200. For instance, the user may press a button, start an app on a smartphone 200, shake communications device 200, or perform a gesture. Likewise, the entire process of generating the key or establishing secure communications may be initiated in response to receiving such a user instruction. Further optionally, magnetic-field generator 204 may generate the excitation magnetic field in response to receiving a request from the other communications device. For instance, with reference to FIGS. 3 and 4, magnetic-field generator 114 comprised in first communications device 110 may generate excitation magnetic field 310 or 410 in response to receiving a request from second communications device 120, via communications interfaces 205. The request may, e.g., relate to establishing a secure communication session between communications devices 110 and 120, or to a request for establishing a shared secret.

According to another embodiment of the invention, the excitation magnetic field is generated by the other communications device. For instance, this is the case for second communications device 120 illustrated in FIGS. 3 and 4, which measures spatially-varying magnetic field(s) 320, or 420 and 430, which arise in response to excitation magnetic field 310 or 410, respectively, generated by magnetic-field generator 114 comprised in first communications device 110.

Processing means 206 comprised in communications device 200 is operative to acquire a set of values from sensor array 201 and derive the key from the set of values. The values represent the spatially-varying magnetic field, in particular the spatial variations of the measured magnetic field. Sensor array 201 may measure the spatially-varying magnetic field, and processing means 206 may acquire the set of values from sensor array 201, either continuously or periodically, in response to detecting the excitation magnetic field generated by communications device 200 or by the other communications device, or on request by processing means 206. That is, processing means 206 may further be operative to control magnetic-field generator 204 to generate the excitation magnetic field.

Even further, processing means 206 may be operative to use the generated key as a shared secret in communications with the other communications device. For instance, two communications devices, such as communications devices 110 and 120, may attempt to establish a secure communication session for the purpose of verifying that both communications devices have generated the same key. The secure communication session may either be established directly between the two communications devices, or via a third party, such as a server or a broker for effecting financial transactions at a point-of-sale.

Processing means 206 may be operative to derive the key from the set of values using a number of alternatives. In the present context, the key, sometimes also referred to as security token, is a string, vector, sequence, or array, of bits, characters, or any other kind of symbols, which may be used in security applications such as encryption, decryption, signing, hashing, and the like.

For instance, the key may be derived from the set of values by means of base conversion. Here it is assumed that the set of values comprises N values, which are acquired from sensor array 201. Each of the values may, e.g., correspond to one of N sensors 202 of sensor array 201. In order to generate the key, each of the N values may be presented as a binary number of k bits, resulting into a total number of K=kN bits which may be extracted from the set of values. To increase resilience against measurement noise and the like, only the most significant bits may be used.

In order to provide a more reliable way of generating identical copies of the key at two communications devices, in particular under slightly varying orientation, and the like, more sophisticated methods may be used for deriving the key from the set of values. For instance, instead of directly converting the N values into binary form, one may base the key derivation on properties of the set of values which provide more resilience against noise and other measurement artifacts. Such properties may, e.g., be statistical properties of the set of values, such as a minimum value, a maximum value, a mean value, or the like, or an order which is imposed on the set of values. The key may then be derived based on respective indices or positions of sensors 202 in sensor array 201.

Figure 5:
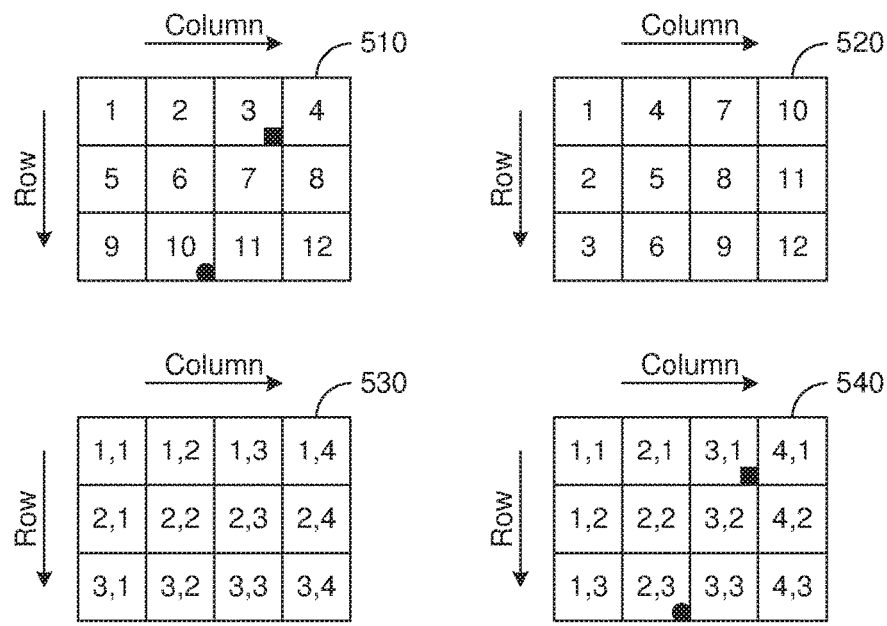
FIG. 5 illustrates different ways of assigning indices to the sensors in the sensor array, in accordance with embodiments of the invention.

More specifically, it is assumed that each value of the set of values represents the spatially-varying magnetic field measured by a respective sensor 202 of sensor array 201, and that each sensor 202 in sensor array 201 is associated with an index identifier which is related to its position in sensor array 201. Different ways of assigning indices to sensors 202 in sensor array 201 are illustrated in FIG. 5. As a first example 510, sensors 202 may be indexed according to a row-major order from a lowest index, e.g., 1, to a highest index, e.g., the maximum number of sensors 202 in sensor array 201, in FIG. 5 assumed to be equal to 12. As a second example 520, sensors 202 may be indexed according to a column-major order from the lowest index to the highest index. As a third example 530, sensors 202 may be identified based on an array- or matrix-style notation "n, m", where n is the index of the row of a certain sensor and m is the index of the column of the sensor in sensor array 201. Finally, as a fourth example 540 the order of indices n and m may be reversed, i.e., sensors 202 are identified as "m, n".

To this end, processing means 206 is operative to derive the key from the set of values by selecting one or more values of the set of values, and derive the key based on one or more indices of sensors 202 which have measured the one or more selected values.

For instance, one may select the minimum value and the maximum value of the set of values acquired from sensor array 201. Subsequently, the indices of the sensors 202 which have measured these values are determined. As an example, it is assumed here that sensors 202 are indexed according to order 510, and that the sensor with index "3" (marked with a filled square) has measured the minimum value whereas the sensor with index "10" (marked with a filled circle) has measured the maximum value. Then, the key is derived from these two indices, e.g., as a concatenation of the binary representations of the index for the minimum value, "0011" (assuming a 4-bit representation allowing for up to 16 sensors, and $0.8+0.4+1.2+1.1=3$), and that of the index for the maximum value, "1010", i.e., "00111010". As a further example, if sensors are index according to order 540, the same two sensors are identified by indices "3,1" and "2,3", respectively. In this case, using a 2-bit representation for each of the row- and the column-index (allowing for up to four rows and columns, respectively), the index for the minimum value is "1101" in binary representation (concatenating the binary representation of the row-index, $1·2+1·1=3$, and that of the column-index, $0·2+1·1=1$) and the index for the maximum value is "1011" in binary representation, which may, e.g., be concatenated into a key "11011011". Deriving the key based on sensor positions, by utilizing indices which reflect an order of sensors 202 in sensor array 201, is advantageous in that the generating the key is less sensitive to measurement noise and variations due to device orientation and the like.

It will also be appreciated that the key derivation algorithm may be extended to include not only the minimum and maximum values but also additional values according to an order of the set of values. For instance, all N values may be sorted in ascending or descending order, and the sequence of the corresponding sensor indices may be utilized for deriving the key. For instance, the indices associated with the measured values sorted in ascending or descending order, may be concatenated into the key. For sensor arrays illustrated in FIG. 5, this would result in a key of K=4N bits, owing to the four bits required to represent the N=12 sensor indices, i.e., 48 bits.

Optionally, all measured values acquired from sensor array 201 may be scaled using a maximum value, a minimum value, an average value, a running average value, or the like. The algorithm which is utilized for deriving the key from the set of values should not be sensitive to small variations and allow generating the same key, with rather high likelihood, in both communications devices.

As a further improvement, if sensor array 111 comprised in first communications device 110 is used to probe battery 123 comprised in second communications device 120, it is desirable that the key may be derived with a certain level of invariance to relative translations of communications devices 110 and 120. This may be realized by utilizing a sensor array 111 which has a surface area larger than that of battery 123, and selecting only a subset of the sensors in sensor array 111 for deriving the key. For instance, a subset of sensors may be selected which are contained within a circumference corresponding to that of battery 123.

In the field of PUFs, bit extraction algorithms are known which are reliable to noise and variations in measurement conditions. One such algorithm is the LISA algorithm [C.-E. D. Yin and G. Qu, "LISA: Maximizing RO PUF's secret extraction", in 2010 IEEE International Symposium on Hardware-Oriented Security and Trust (HOST), pages 100-105, 2010]. The algorithm is based on the understanding that individual values of a set of measured values may not be very stable. In the present context, they may, e.g., vary with the relative orientation of communications devices 110 and 120. Rather than considering individual values, the algorithm utilizes pairs of values which are measured by sensors 202 which are further apart. The sign of a difference of the pair of values may then be used to extract one bit. Since the values belonging to the same pair are measured far apart, resilience against noise and variations in measurement conditions is achieved. An alternative algorithm which may be used to extract bits in a reliable and stable manner is the Kendall Syndrome Coding (KSC) algorithm [C.-E. Yin and G. Qu, "Kendall Syndrome Coding (KSC) for Group-Based Ring-Oscillator Physical Unclonable Functions", Technical report, University of Maryland, 2011].

Further with reference to FIG. 2, communications device 200 may comprise additional components such as a display, a touchscreen, one or more keys or a keyboard, a camera, or the like.

Figure 6:
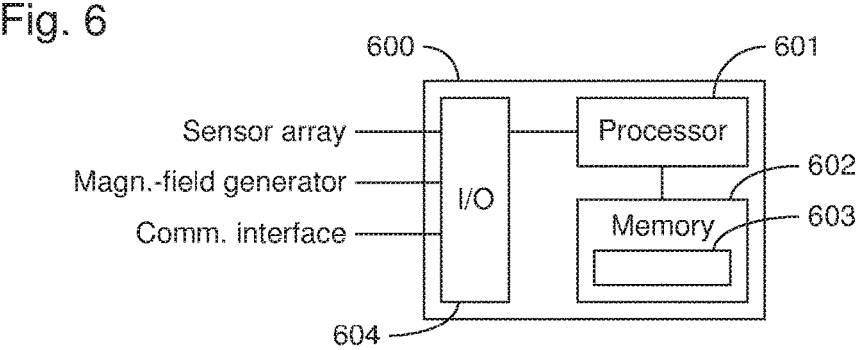
FIG. 6 shows an embodiment of the processing means comprised in the communications device.

In the following, an embodiment 600 of processing means 206 is described with reference to FIG. 6. Processing means 600 comprises a processing unit 601, such as a general purpose processor, and a computer-readable storage medium 602, such as a Random Access Memory (RAM), a Flash memory, or the like. In addition, processing means 600 comprises one or more interfaces 604 ('I/O' in FIG. 6) for controlling and/or receiving information from sensor array 201, magnetic-field generator 204, communications interface 205, and optionally additional components, such as one or more keys, a keypad or keyboard, and a display or touchscreen. Memory 602 contains computer-executable instructions 603, i.e., a computer program, for causing a communications device, such as a mobile terminal, a UE, a smartphone, a wearable device, a tablet, a smartwatch, a cash register, a payment terminal, a sensor, an actuator, or a laptop, to perform in accordance with an embodiment of the invention as described herein, when computer-executable instructions 603 are executed on processing unit 601.

Figure 7:
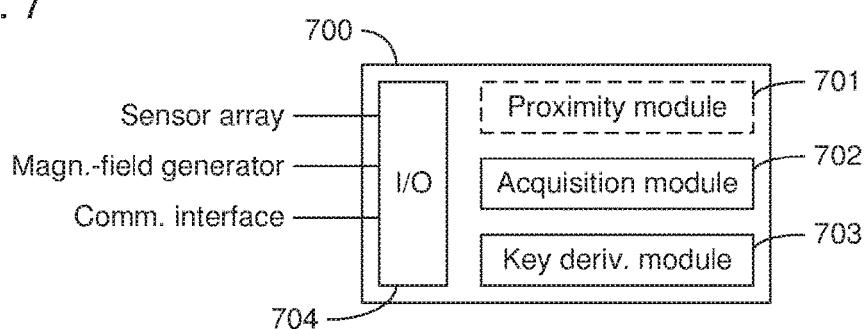
FIG. 7 shows another embodiment of the processing means comprised in the communications device.

FIG. 7 shows an alternative embodiment 700 of processing means 206 comprised in communications device 200. Processing means 700 comprises an acquisition module 702 for acquiring a set of values from sensor array 201, which set of values represents the spatially-varying magnetic field measured by sensor array 201, a key derivation module 703 for deriving the key from the set of values, and one or more interface modules 704 ('I/O' in FIG. 7) for controlling and/or receiving information from sensor array 201, magnetic-field generator 204, communications interface 205, and optionally additional components, such as one or more keys, a keypad or keyboard, and a display or touchscreen. Optionally, processing means 700 may further comprise a proximity module 701 for detecting proximity of another communications device. Proximity module 701, acquisition module 702, and key derivation module 703, and additional modules which processing means 700 may comprise, are configured to perform in accordance with an embodiment of the invention as described herein.

Modules 701-704, as well as any additional modules comprised in processing means 700, may be implemented by any kind of electronic circuitry, e.g., any one, or a combination of, analogue electronic circuitry, digital electronic circuitry, and processing means executing a suitable computer program.

Figure 8:
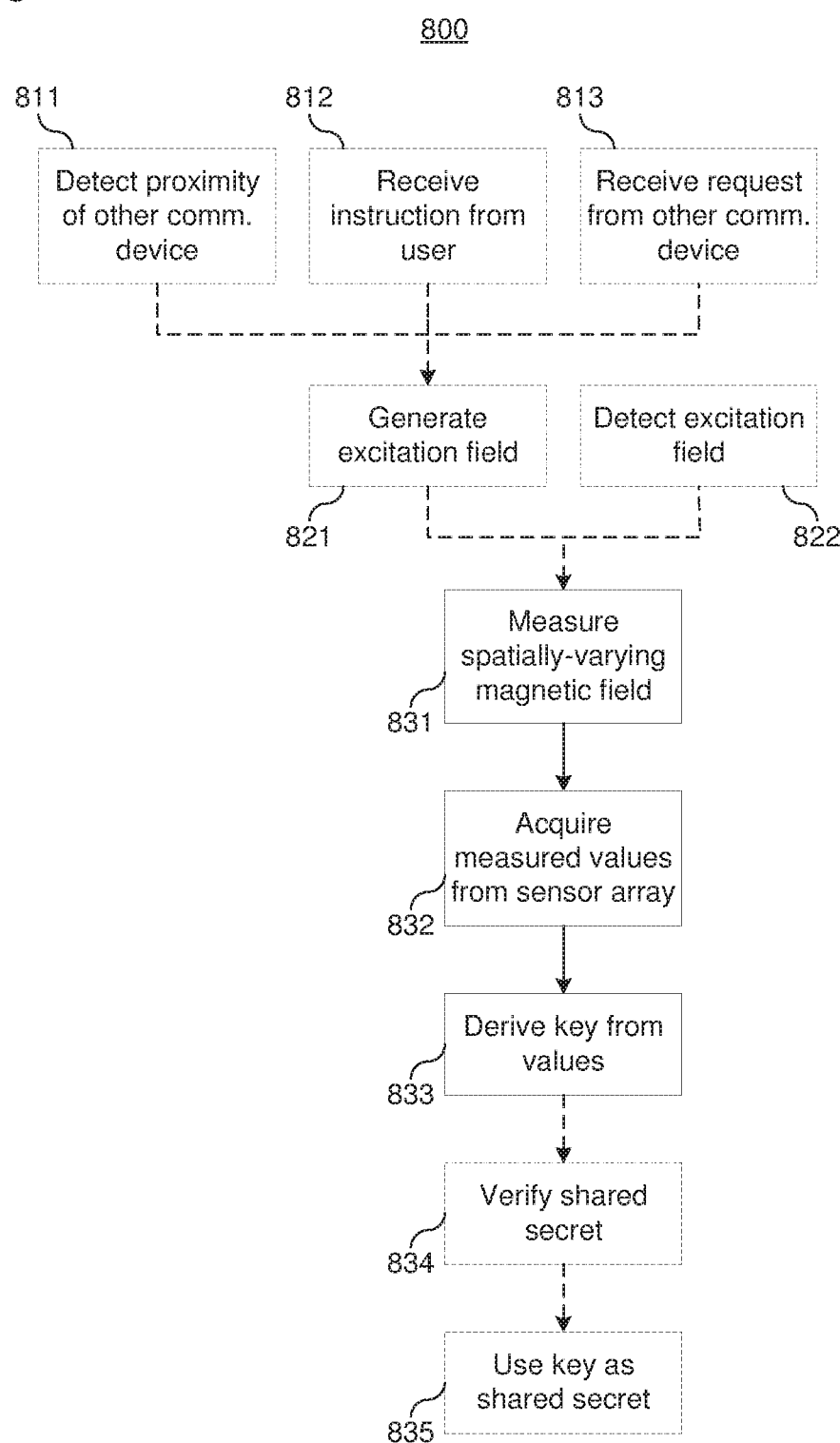
FIG. 8 shows a flow chart illustrating a method of a communications device, in accordance with an embodiment of the invention.

In the following, embodiments 800 of the method of a communications device, for generating a key for use as a shared secret in communications with another communications device, are described with reference to FIG. 8.

Method 800 comprises measuring 831 a spatially-varying magnetic field originating from a first spatially-varying density of metallic particles comprised in a first battery, when subjected to an excitation magnetic field. The first battery may, e.g., be comprised in the communications device. The spatially-varying magnetic field is measured 831 using a sensor array. Method 800 further comprises acquiring 832 a set of values from the sensor array, which set of values represents the spatially-varying magnetic field. Even further, method 800 comprises deriving 833 the key from the set of values.

Optionally, the measured magnetic field originates from the first spatially-varying density of metallic particles and a second spatially-varying density of metallic particles comprised in a second battery, when subjected to the excitation magnetic field. The second battery is comprised in the second communications device.

Method 800 may further comprise generating 821 the excitation magnetic field. Optionally, the excitation magnetic field is generated 821 in response to detecting 811 proximity of the other communications device. Alternatively, the excitation magnetic field may be generated 821 in response to receiving 812 an instruction from a user of the communications device, or in response to receiving 813 a request from the other communications device.

According to an embodiment of method 800, the excitation magnetic field may be generated by the other communications device. Optionally, the set of values is acquired 832 from the sensor array in response to detecting 822 the excitation magnetic field generated by the other communications device.

According to an embodiment of method 800, method 800 may further comprise using 835 the key as a shared secret in communications with the other communications device. Optionally, the shared secret may be verified, i.e., it may be verified that the communications device and the other communications device have generated identical keys.

According to an embodiment of method 800, the key is derived 833 from the set of values by means of base conversion.

According to another embodiment of method 800, each value of the set of values represents the spatially-varying magnetic field measured by a respective sensor of the sensor array, and the key is derived 833 from the set of values by selecting one or more values of the set of values and deriving the key based on one or more indices of sensors which have measured the one or more selected values.

It will be appreciated that method 800 may comprise additional, or modified, steps in accordance with what is described throughout this disclosure. Method 800 may be performed by a communications device such as a mobile terminal, a UE, a smartphone, a wearable device, a tablet, a smartwatch, a cash register, a payment terminal, or a laptop. An embodiment of method 800 may be implemented as software, such as computer program 603, to be executed by processing unit 601 comprised in communications device 200, whereby communications device 200 is operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. A communications device for generating a key for use as a shared secret in communications with another communications device, the communications device comprising:
   a communications interface configured to effect communications with the other communications device;
   a sensor array configured to measure a spatially-varying magnetic field originating from a first spatially-varying density of metallic particles comprised in a first battery, when subjected to an excitation magnetic field; and
   a processing circuit configured to:
      acquire a set of values from the sensor array, the set of values representing the spatially-varying magnetic field, and
      derive the key from the set of values.

2. The communications device of claim 1, further comprising the first battery.

3. The communications device of claim 2, wherein the measured magnetic field originates from the first spatially-varying density of metallic particles and a second spatially-varying density of metallic particles comprised in a second battery, when subjected to the excitation magnetic field, which second battery is comprised in the other communications device.

4. The communications device of claim 1, further comprising a magnetic-field generator for generating the excitation magnetic field.

5. The communications device of claim 4, wherein the excitation magnetic field is generated in response to detecting proximity of the other communications device.

6. The communications device of claim 4, wherein the excitation magnetic field is generated in response to receiving an instruction from a user of the communications device.

7. The communications device of claim 4, wherein the excitation magnetic field is generated in response to receiving a request from the other communications device.

8. The communications device of claim 1, wherein the excitation magnetic field is generated by the other communications device.

9. The communications device of claim 8, wherein the set of values is acquired from the sensor array in response to detecting the excitation magnetic field generated by the other communications device.

10. The communications device of claim 1, wherein the processing circuit is further configured to use the key as a shared secret in communications with the other communications device.

11. The communications device of claim 1, wherein the processing circuit is configured to derive the key from the set of values by means of base conversion.

12. The communications device of claim 1, wherein each value of the set of values represents the spatially-varying magnetic field measured by a respective sensor of the sensor array, and wherein the processing circuit is configured to derive the key from the set of values by:
    selecting one or more values of the set of values; and
    deriving the key based on one or more indices of sensors which have measured the one or more selected values.

13. The communications device of claim 1, wherein the sensor array comprises sensors based on any one, or a combination, of inductors, magneto-resistive sensors, Hall-effect sensors, spin transistors, fluxgates, magneto-electrical sensors, and magneto-optical sensors.

14. The communications device of claim 1, being any one of a mobile terminal, a User Equipment, a smartphone, a wearable device, a tablet, a smartwatch, a cash register, a payment terminal, a sensor, an actuator, or a laptop.

15. A vehicle comprising the communications device of claim 1.

16. A method of a communications device of generating a key for use as a shared secret in communications with another communications device, the method comprising:
    measuring, using a sensor array, a spatially-varying magnetic field originating from a first spatially-varying density of metallic particles comprised in a first battery, when subjected to an excitation magnetic field;
    acquiring a set of values from the sensor array, the set of values representing the spatially-varying magnetic field; and
    deriving the key from the set of values.

17. The method of claim 16, wherein the first battery is comprised in the communications device.

18. The method of claim 17, wherein the measured magnetic field originates from the first spatially-varying density of metallic particles and a second spatially-varying density of metallic particles comprised in a second battery, when subjected to the excitation magnetic field, which second battery is comprised in the other communications device.

19. The method of claim 16, further comprising generating the excitation magnetic field.

20. The method of claim 19, wherein the excitation magnetic field is generated in response to detecting proximity of the other communications device.

21. The method of claim 19, wherein the excitation magnetic field is generated in response to receiving an instruction from a user of the communications device.

22. The method of claim 19, wherein the excitation magnetic field is generated in response to receiving a request from the other communications device.

23. The method of claim 18, wherein the excitation magnetic field is generated by the other communications device.

24. The method of claim 23, wherein the set of values is acquired from the sensor array in response to detecting the excitation magnetic field generated by the other communications device.

25. The method of claim 16, further comprising using the key as a shared secret in communications with the other communications device.

26. The method of claim 16, wherein the key is derived from the set of values by means of base conversion.

27. The method of claim 16, wherein each value of the set of values represents the spatially-varying magnetic field measured by a respective sensor of the sensor array, and the key is derived from the set of values by:
    selecting one or more values of the set of values; and
    deriving the key based on one or more indices of sensors which have measured the one or more selected values.

28. The method of claim 16, wherein the sensor array comprises sensors based on any one, or a combination, of inductors, magneto-resistive sensors, Hall-effect sensors, spin transistors, fluxgates, magneto-electrical sensors, and magneto-optical sensors.

29. The method of claim 16, wherein the communications device is any one of a mobile terminal, a User Equipment, a smartphone, a wearable device, a tablet, a smartwatch, a cash register, a payment terminal, or a laptop.

30. A non-transitory computer-readable medium comprising, stored thereupon, a computer program comprising computer-executable instructions configured so that, when the computer-executable instructions are executed on a processing unit comprised in a communications device, the computer-executable instructions cause the communications device to:
    measure, using a sensor array, a spatially-varying magnetic field originating from a first spatially-varying density of metallic particles comprised in a first battery, when subjected to an excitation magnetic field;
    acquire a set of values from the sensor array, the set of values representing the spatially-varying magnetic field; and
    derive the key from the set of values.

* * * * *